United States Patent [19]

Goretta et al.

[11] 4,307,215

[45] Dec. 22, 1981

[54] FORMIC ACID AND ALKALI METAL FORMATES AS CHAIN TRANSFER AGENTS IN THE PREPARATION OF ACRYLAMIDE POLYMERS

[75] Inventors: Louis A. Goretta, Naperville; Robert R. Otremba, Chicago, both of Ill.

[73] Assignee: Nalco Chemical Company, Oak Brook, Ill.

[21] Appl. No.: 124,489

[22] Filed: Feb. 25, 1980

[51] Int. Cl.$^3$ .................................................. C08F 122/38
[52] U.S. Cl. ............................. 526/213; 526/303.1; 526/307.6; 526/307.3
[58] Field of Search ................................. 526/213, 303

[56] References Cited

U.S. PATENT DOCUMENTS

| | | | |
|---|---|---|---|
| 3,328,362 | 6/1967 | Roberts et al. | 525/334 |
| 3,929,739 | 12/1975 | Barabas et al. | 526/303 |
| 4,125,508 | 11/1978 | Elfers | 526/303 |

*Primary Examiner*—Harry Wong, Jr.
*Attorney, Agent, or Firm*—John G. Premo; Robert A. Miller; John S. Roberts, Jr.

[57] ABSTRACT

A method of using formic acid or metal salts thereof in effective concentrations as very efficient chain transfer agents to limit the molecular weight and intrinsic viscosity of acrylamide based polymers. The formic acid or metal formate is utilized in such polymers by adding to the monomer prior to polymerization amounts of 0.05-6.5% by weight to control polymer molecular weights where the subsequent polymer is to be used as a flocculating agent, sewage treatment agent, or any other appropriate use. Polymers of special interest in this invention are polyacrylamide and anionic or cationic copolymers of acrylamide. Examples of polymers which can be made according to this invention include polyacrylamide (nonionic), copolymers of acrylamide, and N,N-dimethylaminoethylmethacrylate (cationic) and copolymers of acrylamide and acrylic acid (anionic). In the manufacture of the subject polymer, the percent monomer employed can range from about 10-90% by weight and is preferably from 10-50% by weight. In the most preferred practice of this invention, the percent monomer ranges from approximately 20-35% by weight.

6 Claims, No Drawings

FORMIC ACID AND ALKALI METAL FORMATES AS CHAIN TRANSFER AGENTS IN THE PREPARATION OF ACRYLAMIDE POLYMERS

The present invention relates to the utilization of formic acid and alkali metal formates such as sodium formate as chain transfer agents in limiting the polymerization and molecular weight of acrylamide polymers and copolymers. The chain transfer agent is the formate ion and, therefore, any formate compound capable of supplying formate ions, such as alkaline earth formates, may also be used in this invention. Polymers may be nonionic, such as polyacrylamide; cationic, such as copolymers of acrylamide and N,N-dimethylaminoethylmethacrylate; or anionic, such as copolymers of acrylamide and acrylic acid.

In the above polymers the percent acrylamide monomer can range from about 10-90% by weight and is preferably in the range of 10-50% by weight prior to polymerization. Most preferably from about 20-35% by weight of monomer is present in solution prior to polymerization.

It is the purpose of this invention to represent these polymers and additives in different amounts, depending upon the utility to which they are designed. For example, where the polymers find use as flocculating agents, the percent formate compound is generally in the range of 0.05-1% by weight of acrylamide monomer. To obtain lower molecular weight materials, formate levels as high as 6.5% can be utilized. Low molecular weight water-soluble polymers prepared with high levels of formate can be utilized, for example, as dispersants. It is thus seen that formate levels employed in this invention can vary substantially between the range of 0.05% by weight and 6.5 or higher percent by weight of acrylamide monomer.

The term "chain transfer agent" is one denoting limitation or control of polymerization or molecular weight by its presence in the polymerizing system. As the term indicates, the chain termination or transfer will, in selected cases, put a stop to chain growth. An alternative definition of chain transfer agents is that they are compounds that can react with growing chains to interrupt the growth of a particular molecule. In the present case, a very limited number of treating agents is suggested; namely, formic acid (HCOOH), alkali metal formates, or other compounds capable of giving formate ions such as alkaline earth formates. Carboxylic acids, other than formic acid, are ineffective for purposes of this invention.

In the research leading towards this invention, it is noted that if the chain transfer agent in any amount were added to the polymer after polymerization, there was no effective result, but where the formate was added to the monomer prior to polymerization, a very effective result was obtained, such as limitation of the molecular weight, etc. Table I demonstrates the effect of chain transfer agent levels on the intrinsic and reduced specific viscosities of polyacrylamide.

TABLE I

SODIUM FORMATE AS A CHAIN TRANSFER AGENT FOR POLYACRYLAMIDE

| % Sodium Formate (Based on Total) | Int. Viscosity | RSV* |
|---|---|---|
| 1.0 | 1.8 | 2.00 |
| 0.2 | 5.3 | 6.47 |
| 0.15 | 7.3 | 9.23 |
| 0.10 | 8.3 | 11.20 |

*Reduced specific viscosity

PREPARATION OF POLYACRYLAMIDE USING SODIUM FORMATE

With polyacrylamide, one purpose of the present invention was to replace less efficient chain transfer agents with sodium formate or other formate compounds. In the tests a product using 4% formate in polyacrylamide or polyacrylamide latex was utilized which gave an intrinsic viscosity of 0.5 polyacrylamide. In other laboratory experiments, at 1% sodium formate (based on total latex=3.64% based on acrylamide monomer) an intrinsic of 1.8 was obtained. At 2% an intrinsic of 1.3 was obtained. Additional runs showed 0.8 intrinsic viscosity at 2.75% formate. The exact amount of formate employed will be dictated by the end use to which the polymer will be applied, since specific uses often require different molecular weights in order to generate desired activities.

PRIOR ART STATEMENT

U.S. Pat. No. 3,328,362, Roberts, et al—This patent, dealing with different polymers and monomers than the present invention, lists a group of starting polymeric reactants mostly thermoplastic at column 1, lines 15-25, and at column 2, lines 5+. This patent does not link the generalized idea of polyacrylamide and polyacrylamide polymers with the utilization of formic acid and sodium formate. The disclosure of formic is made at column 3, line 29, and in claim 1.

In the present invention, the term "formic acid" will include the free acid as well as alkali metal and ammonium salts of formic acid and other formate salts capable of providing formate ions.

EXAMPLE 1

Comparison of Sodium Formate and Sodium Acetate Added to the Monomer of a Cationic Copolymer of Acrylamide

|  | Sodium Formate | Sodium Acetate |
|---|---|---|
| Acrylamide, 44.3% | 641.5 | 641.5 |
| Soft Water | 48.9 | 48.9 |
| Dimethylaminoethyl methacrylate | 37.4 | 37.4 |
| Versene | 0.05 | 0.05 |
| Sodium formate | 64.7 | — |
| Sodium acetate | — | 64.7 |
| Low Odor Paraffin Solvent (LOPS) | 258.6 | 258.6 |
| Sorbitan monooleate (SPAN 80) | 6.81 | 6.81 |
| Substituted oxazoline (Alkaterge T) | 6.81 | 6.81 |
| Initiator | 0.08 | 0.08 |

Sample heated for 4 hours 15 minutes at a temperature between 30°-45° C.

| Results | Sodium Formate | Sodium Acetate |
|---|---|---|
| $|\eta|$ | 0.428 | 18.3 |
| Reduced specific viscosity | 0.432 | 24.4 |
| Molecular weight | $3.79 \times 10^4$ | $1.38 \times 10^7$ |

One hour post-heat at 53° C., cooled to room temperature

| Results | | |
|---|---|---|
| $|\eta|$ | 0.428 | 17.8 |
| Reduced specific viscosity | 0.432 | 23.9 |
| Molecular weight | $3.79 \times 10^4$ | $1.32 \times 10^7$ |

Examples 2, 2A and 2B demonstrate the effect of sodium formate level on the RSV and intrinsic viscosity of polyacrylamide.

EXAMPLE 2

Preparation of Polyacrylamide with Sodium Formate (1%)

| Raw Materials | Procedure Weight (grams) |
|---|---|
| Oil Phase | |
| Low Odor Paraffin Solvent (LOPS) | 291.83 |
| Sorbitan monooleate (SPAN 80) | 15.84 |
| Monomer Phase | |
| 46.6% Acrylamide soln. | 635.46 |
| D.I. H$_2$O | 46.27 |
| Sodium formate (1% of latex) | 10.00 |
| Versene | 0.03 |
| NaOH or H$_2$SO$_4$ | Trace - pH 6.9 ± .3 |
| Initiator | 0.40 |

Four-hour heat at 900 cc/min. N$_2$, followed by 1 hour post-heat at 77° C.

| Product Specifications: | $|\eta|$, /, 1.79 |
|---|---|
| | Reduced specific viscosity, 2.00 |
| | Molecular wieght, $3.79 \times 10^5$ |
| | Huggins Const., 0.630 |
| | % Residual acrylamide, <0.4% |

EXAMPLE 2A

Preparation of Polyacrylamide with Sodium Formate (0.2%)

| Raw Materials | Procedure Weight (grams) |
|---|---|
| Oil Phase | |
| Low Odor Paraffin Solvent (LOPS) | 291.83 |
| Sorbitan monooleate (SPAN 80) | 15.84 |
| Monomer Phase | |
| 46.6% Acrylamide soln. | 635.46 |
| D.I. H$_2$O | 46.27 |
| Sodium formate (0.2%) | 1.98 |
| Versene | 0.03 |
| NaOH or H$_2$SO$_4$ | Trace - pH 6.9 ± .3 |
| Initiator | 0.40 |

Four-hour heat at 52° C. at 900 cc/min. N$_2$, followed by 1 hour post-heat at 77° C.

| Product Specifications: | $|\eta|$, 5.33 |
|---|---|
| | Reduced specific viscosity, 6.47 |
| | Molecular weight, $1.98 \times 10^6$ |
| | Huggins const., .401 |
| | % residual acrylamide, <0.4% |

EXAMPLE 2B

Preparation of Polyacrylamide Using Sodium Formate (0.15%) as Transfer Agent

| Raw Materials | Procedure: Weight (grams) |
|---|---|
| Oil Phase | |
| Low Odor Paraffin Solvent (LOPS) | 291.83 |
| Sorbitan monooleate (SPAN 80) | 15.84 |
| Monomer Phase | |
| 46.6% Acrylamide soln. | 635.46 |
| D.I. H$_2$O | 46.27 |
| Sodium formate | 1.50 |
| Versene | 0.03 |
| NaOH or H$_2$SO$_4$ | Trace pH 6.9 ± .3 |
| Initiator | 0.40 |

Four-hour heat at 52° with 900 cc/min., N$_2$ followed by 1 hour post-heat at 77° C.

| Product Specifications: | $|\eta|$ 7.34 |
|---|---|
| | Reduced specific viscosity, 9.23 |
| | Molecular weight, $3.21 \times 10^6$ |
| | Huggins, 0.351 |
| | % Residual acrylamide, <0.4% |

We claim:

1. The method of preparing acrylamide polymers comprising polymerizing acrylamide or mixtures of 10–90% acrylamide with a monomer selected from the group consisting of N-dimethylaminoethyl methacrylate and acrylic acid in the presence of a chain transfer agent to limit the molecular weight and intrinsic viscosity of the acrylamide polymer wherein said transfer agent is formic acid or an alkali metal salt thereof.

2. The method of preparing acrylamide polymers according to claim 1 comprising polymerizing acrylamide as the sole monomer.

3. The method of claim 1 wherein the chain transfer agent is used in effective concentrations of 0.05 to 6.5% by weight of acrylamide.

4. The method of claim 3 comprising polymerizing acrylamide wherein the effective concentrations of 0.05 to 0.2% of formic acid are utilized.

5. The method of claim 3 comprising polymerizing acrylamide with acrylic acid wherein the effective concentrations of 0.05 to 0.2% of formic acid are utilized.

6. The method of claim 3 comprising polymerizing acrylamide with dimethylaminoethyl methacrylate wherein the effective concentrations of 0.05–0.2% of formic acid are utilized.

* * * * *